United States Patent [19]

Gosling et al.

[11] 4,046,386
[45] Sept. 6, 1977

[54] CONTROL DEVICE

[75] Inventors: Alexander Bennett Gosling; Keith Douglas Ridler; Frederick James Easthope; Colin Howard Stanwell-Smith, all of Cambridge, England

[73] Assignee: Strathearn Audio Limited, Belfast, Northern Ireland

[21] Appl. No.: 661,983

[22] Filed: Feb. 27, 1976

[30] Foreign Application Priority Data

Feb. 28, 1975 United Kingdom ............... 8501/75

[51] Int. Cl.² ............................................. G11B 3/38
[52] U.S. Cl. ................................................ 274/23 A

[58] Field of Search ....................... 274/23 A

[56] References Cited
U.S. PATENT DOCUMENTS 3,572,724  3/1971  Rabinow .............. 274/23 A
3,675,932  7/1972  Rabinow .............. 274/23 A Primary Examiner—Charles E. Phillips
Attorney, Agent, or Firm—Cesari and McKenna

[57] ABSTRACT

Method and apparatus for accurately controlling the position of a first member such as a phonograph stylus relative to a second movable member on which it is carried.

5 Claims. 6 Drawing Figures

To Coils 28,29
To Motor 31

CONTROL DEVICE

This invention relates to an apparatus and a method which are suitable for use in controlling the movement of a stylus arm in a phonograph apparatus. Ideally in such apparatus the stylus should be held with respect to the groove of a recorded disc in such a way that, as the disc is played, the stylus travels along a radial line across the disc.

A simple way to obtain such a controlled movement is by arranging the stylus on an arm which extends from a guide rail running parallel to the desired radial line at an angle of approximately 90°, the arm being attached to the guide rail by a bearing which is able to slide along the rail.

However, even with such an arrangement it is not possible to obtain absolutely accurate radial tracking at a uniform speed, due, for example to play in the bearing.

The present invention is concerned with the provision of an apparatus and a method by means of which the position of a first member relative to a second member upon which it is carried can be more accurately controlled and, although the invention has particular application in the control of a stylus arm for phonograph equipment, it is not limited to such an application.

Figure 1:
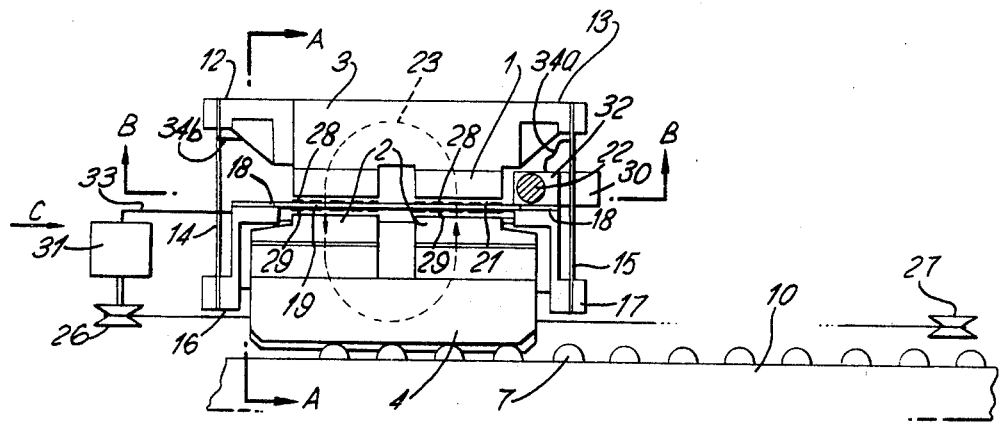
Figure 2:
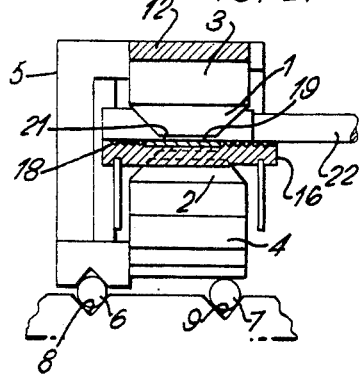
Figure 3:
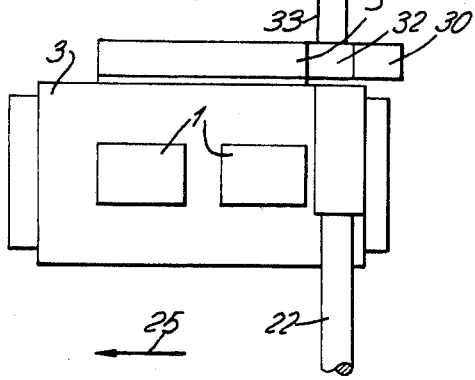
Figure 4:
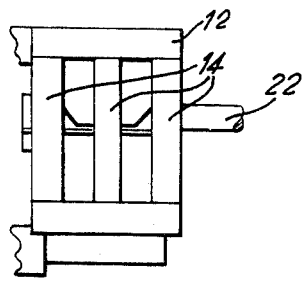
Figure 5:
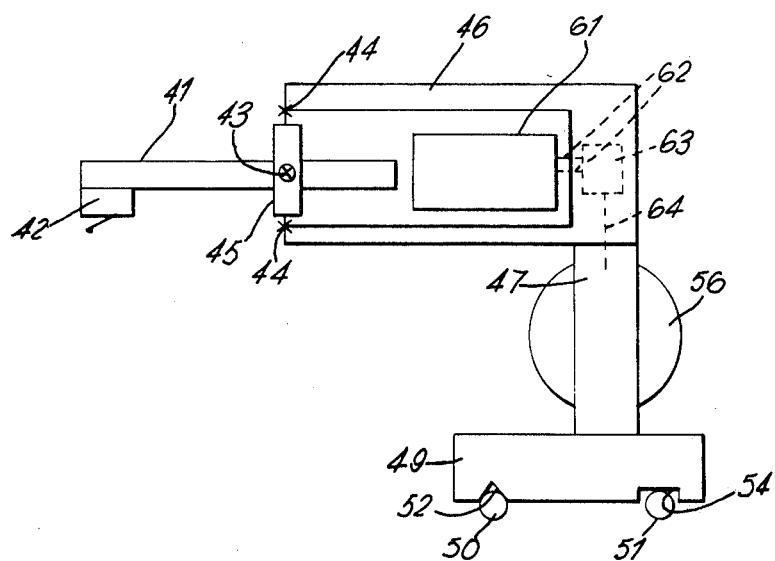
Figure 6:
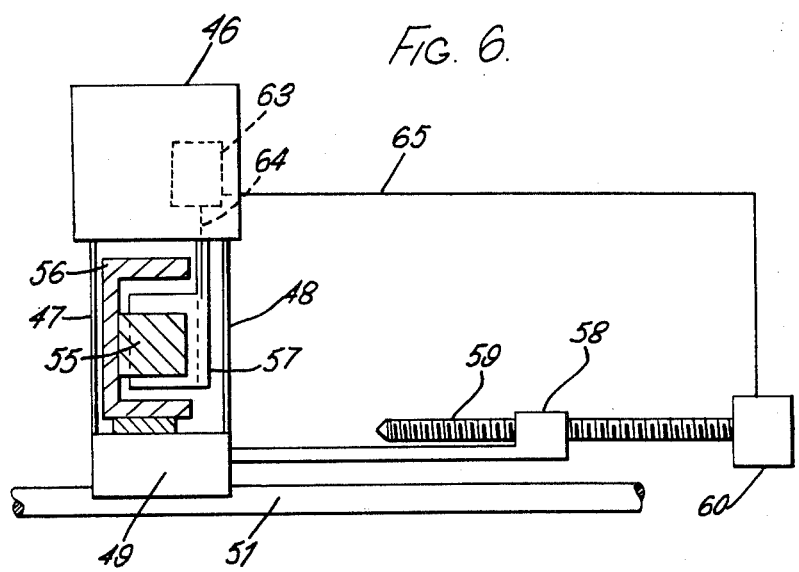

Embodiments of a control device in accordance with the invention will now be described with reference to the accompanying drawings in which:

FIG. 1 is a partly diagrammatic side view of a control device resting on a linear bearing, FIG. 2 is a section on the line A—A of FIG. 1, FIG. 3 is a partly diagrammatic section on the line B—B of FIG. 1, FIG. 4 is an end view of the device of FIG. 1 taken in the direction of the arrow C, and partly cut away and FIGS. 5 and 6 of the accompanying drawings, show diagrammatic side and rear elevations of a further parallel tracking arm servo-system respectively.

Referring to the drawings, there are shown two C shaped permanent magnets 1 and 2 with their associated iron circuits, the magnet 1 being arranged above the magnet 2 and the magnets being held in respective blocks 3 and 4 made of non-magnetic and non-electrically conducting material. The blocks 3 and 4 and the magnets 1 and 2 are held apart by means of a yoke 5, also made of a non-magnetic and a non-electrically conducting material. The lower of carriage block 4 constitutes a carrier member and rides on two rows of ball bearings 6 and 7 which run in linear grooves 8 and 9 in a base 10 and which form a bearing for the device. The upper block 3 carries a pair of hangers 12 and 13, one at each end of the block, and from each of these hangers there are suspended respective flat springs 14 and 15. The ends of the springs 14 and 15 not attached to the hangers are attached to respective brackets 16 and 17 which extend from a respective end of a light, but rigid, frame 18 which carries a printed circuit board 19 so that the board 19 extends within an air gap 21 between the magnets 1 and 2. One end of a gramophone pick-up arm 22 is mounted upon the frame 18 which constitutes a further carrier member and provides a pivot for the arm and the other end of the arm 22 (not shown) carries a phonograph stylus.

The magnets 1 and 2 form a rigid block and are so arranged that a magnetic field passes through the printed circuit board 19 in the way indicated by the dotted line in FIG. 1. The suspension of the printed circuit board 19 by the springs 14 and 15 is such that limited movement of the board can occur in directions parallel to the direction of tracking of the stylus indicated by the arrow 25 in FIG. 3, with a minimum of resistance. However, the stiffness of the springs is such that there is considerable resistance to movement of the board in other directions.

On each of the sides of the printed circuit board 19 there is a respective rectangular spiral coil 28, 29, the coils 28, 29 being so arranged and connected together in series that the passage of a current through the coils is able to cause longitudinal movement of the board 19 and frame 18 with respect to the magnets as a result of interaction with the magnetic field in the gap 21. The current which is passed through the coils 28, 29 is determined by a sensor, indicated diagrammatically at 30, responsive to movement of the arm 22 away from a tangent to the groove of a record being played, for example a sensor as described in co-pending application Ser. No. 548603 filed Feb. 10, 1975, now abandoned, and applied to the coils via the springs 14 and 15.

The lower or carriage block 4 is moved along the linear bearing provided by the ball bearings 6 and 7 in the grooves 8 and 9 by a simple electrically driven motor illustrated diagrammatically at 31 in FIG. 1 which is coupled to the ends of the block by a cable running over pulleys 26, 27. The gearing is such that ideally the block 3 moves along the bearing at such a rate that the stylus on the arm 22 is maintained tangential to the groove on a recorded disc so that it moves radially across the disc. Under these conditions, the arm 22 is maintained at right angles to the blocks 3 and 4 and there is no requirement for relative movement between the circuit board 19 and the magnets 1 and 2 to correct the position of the arm 22.

However, should the speed of the carriage block 4 along the linear bearing be either faster or slower than that of the stylus across the disc, there will be movement of the arm 22 from its desired axis and a corresponding output signal from the sensor 30 whose sign indicates whether the blocks 3 and 4 are moving faster or slower than the stylus. The output signal from the sensor 30 is transmitted to a control circuit 32, which has outputs 33 and 34 coupled respectively to a motor 31 for moving the block 4 and to the coils 28, 29 for moving the frame 18 with respect to the block 4, which outputs 33 and 34 are so proportioned and separated that the movement of the block is slowed or speeded, and the relative position of the board 19 and the magnets 1 and 2 are adjusted to bring the arm 22 back into the required neutral position. The output 34 from the circuit 32 is coupled to the coils 28, 29 via the leads 34a and 34b and the springs 14 and 15, as indicated in FIG. 1. In one embodiment, the coils 28, 29 also act as a sensor and an output from a coil 28, 29 is used for circuit 32 instead of the output from the sensor 30 to produce control signals which are applied to the motor 31 and to the other coil 28, 29 to maintain the stylus movement radial. In yet another embodiment, a further coil on the printed circuit board 19 is used as a sensor to provide a control signal.

To minimise overswing, the servo system described can be suitably damped and the frequency response of the system controlling the movement of the block 4 need be no higher than 1 Hz. over a total movement of, for example, 150 mm.

The frequency response of the assembly constituted by the printed circuit board 19 and the springs 14 and 15 can be up to at least 10 Hz and the stroke of the board 19 need be only a few millimetres. A device having an effective frequency response of up to at least 10 Hz is thus provided in a comparatively simple manner by dividing the control signal into a high frequency short stroke portion actuating the motor constituted by the coils 28, 29 and the magnets 1 and 2 and a lower frequency long stroke portion actuating the motor 3.

The drive for the carriage block 4 can, of course, also be used to bring the stylus to a point above a particular position on a disc.

It will be seen that the device includes a short stroke servo that has a high frequency response and a long stroke servo having a lower frequency response.

Although a particular embodiment has been described by way of example, it will be understood that variations and modifications can be made within the scope of the invention.

For example the linear bearing could be constituted by other means than ball bearings and grooves including a fluid of magnetisable material that travels with magnetic areas on the lower part of block 4. Furthermore, although a printed circuit board suspended by a pair of leaf springs which provide circuit connections has been described, a movable detector element supported in some other way could be used, and the detector coils could be attached to the block 4 and a magnet be mounted on a relatively movable element attached to a stylus arm. It would also be possible to use a printed circuit board having a coil on one side only or a plurality of boards having coils arranged in a stack. It could also be arranged for a standing current to be passed through the coils on the printed circuit board when the board is in the correct or normal position and for the error signal to appear as a modulation on the standing current. In order to provide a system which has high flux densities and is difficult to demagnetise, the magnets contain samarium cobalt. It will be appreciated that in the arrangement described the stylus is mounted via springs which assist in reducing the transmission of noise from the carriage block to the stylus. As a result of the use of a servo-system, it is possible to allow wider variations in tolerances than would otherwise be the case. For example the friction characteristics of the arrangement can be less critical than in known arrangements and it will be appreciated that correction is automatically made for wear during use.

A further embodiment, which provides both some isolation of the stylus from noise from the carriage block and short and long servo-control of the movement of the stylus, will now be described with reference to FIGS. 5 and 6.

Referring to FIGS. 5 and 6, there is shown a phonograph pick-up arm 41 carrying a cartridge 42 having a stylus. The arm 41 is pivoted in the horizontal plane by means of a pivot indicated at 43 and in the vertical plane by means of pivots indicated at 44. The pivot 43 is supported by a yoke 45 which in turn is supported via the pivots 44 by a structure 46. The structure 46 constitutes a carrier member and is mounted on transverse leaf springs 47 and 48 which extend substantially vertically from and are supported by a base 49 constituted by a carriage block which constitutes a further carrier member which slides on rails 50 and 51. The base 49 has a Vee groove 52 and a flat or rectangular groove 54 which co-operate with the rails 50 and 51 respectively.

Between the base 49 and the structure 46 there is a force motor with a permanent magnet 55 and a pole piece 56 mounted on the base 49 and a moving coil 57 attached to the structure 46. When current is passed through the coil 57, the electromotive force causes the structure 46 to be deflected along an arc defined by the springs 47 and 48. The base 49 is equipped with a nut 58 threaded on a leadscrew 59 which can be rotated by a motor and gearbox 60 thereby causing the base 49 to move along the rails 50 and 51.

Within the structure 46, there is mounted, by means not shown, a transducer 61 which is arranged to detect angular movement of the arm 41 with respect to the structure 46. In the preferred embodiment the angular movement is detected by detecting the angular displacement of a light beam projected from a lamp in the device 61 and reflected by a surface on the arm 41 on to an opto-electronic transducer element in the device 61. Suitable angular movement detecting arrangements are described in the specification of co-pending patent application Ser. No. 548603 filed Feb. 10, 1975.

The output signal of the transducer 61 is connected via leads 62 to a circuit 63 housed in the structure 46. Control signals derived from the circuit 63 are applied to the coil 57 and the motor 60 via leads indicated diagrammatically at 64 and 65, in accordance with conditions determined by the circuit 63, in order that the arm 41 be maintained in an optimum position. The control circuit 63 determines whether or not a long stoke signal should be applied to the motor 60, a short stroke signal should be applied to the force motor 55, 56, 57, or signals should be applied to both the motor 60 and the force motor 55, 56, 57 and in what proportion they should be one to the other.

In the preferred embodiment, the movement of the structure 46 mounted on the springs 47 and 48 is restricted to a distance sufficient to match the departures of typical record grooves from true spirals. Plus or minus two millimetres is usually sufficient. The movement of the base 49 on rails 50 and 51 is sufficient to traverse the whole recorded area of a normal 12 inch long-playing record.

Because the movement of the weight of the arm 41 and the structure 46 opposes the restoring force of the springs 47 and 48, the net restoring force and hence the natural frequency of vibration can be adjusted to be of any value required. A low value gives isolation from the audible components of noise arising in the motor 60 and from friction at the rails 50 and 51.

The mass of the parts actuated by the force motor coil 57 is less than the mass actuated by the motor 60. Consequently the short stroke elements supported by the structure 46 can conveniently be controlled at higher frequencies than the whole moving system. This makes the short stroke system suitable for following disturbances on the record groove while the leadscrew system acts at lower frequency so that it reacts only as the average inward spiral of the groove.

In a further development, the force motor formed by items 55, 56 and 57, and its associated electronic circuit 61 are omitted. The device retains the ability to isolate the cartridge 42 from noise generated in the sliding system mounted on the rails 50 and 51 but the movement of the device is entirely under the control of the motor 60 and there is no "short" servo-control of the movement of the arm 41.

We claim:

1. A phonograph including a pick-up arm, a first carrier member, the pick-up arm being mounted on the first carrier member, a second carrier member, the second carrier member being mounted for movement along a predetermined straight path, resilient means mounting the first carrier member upon the second carrier member for movement of the first carrier member relative to the second carrier member in directions parallel to the said path, electric motor means for moving the second carrier member along the path, electro-magnetic coupling means between the first and second carrier members, the electro-magnetic coupling means being constituted by a magnet attached to one of the carrier members and a coil attached to the other carrier member, and sensor means for detecting any displacement of the arm from a desired position, a control circuit coupled to the output of the sensor means and means to couple from the control circuit a first electric signal in a first higher frequency band to the coil and a second electric signal in a second lower frequency band to the motor means to move the first and second carrier members in such a way as to tend to compensate for any displacement of the arm from the desired position.

2. A phonograph as claimed in claim 1 in which the resilient mounting means includes a plurality of flat spring elements connected between the first and second members.

3. A phonograph as claimed in claim 2 in which electrical connection to the coil is via the flat spring elements.

4. A phonograph as claimed in claim 1 in which the first carrier member includes a printed circuit board, the coil being on the printed circuit board.

5. A phonograph as claimed in claim 4 including a second coil on the printed circuit board to provide a servo position feedback sensor signal.

* * * * *